US012560818B2

(12) United States Patent
Lee

(10) Patent No.: US 12,560,818 B2
(45) Date of Patent: Feb. 24, 2026

(54) CAMERA MODULE

(71) Applicant: SAMSUNG ELECTRO-MECHANICS CO., LTD., Suwon-si (KR)

(72) Inventor: Ik Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 981 days.

(21) Appl. No.: 17/722,925

(22) Filed: Apr. 18, 2022

(65) Prior Publication Data

US 2023/0161171 A1 May 25, 2023

(30) Foreign Application Priority Data

Nov. 19, 2021 (KR) ........................ 10-2021-0160535

(51) Int. Cl.
*G02B 27/64* (2006.01)
*G02B 5/00* (2006.01)
*G02B 7/09* (2021.01)
(52) U.S. Cl.
CPC ........... *G02B 27/646* (2013.01); *G02B 5/005* (2013.01); *G02B 7/09* (2013.01)

(58) Field of Classification Search
CPC ......... G02B 27/646; G02B 5/005; G02B 7/09
See application file for complete search history.

(56) References Cited

U.S. PATENT DOCUMENTS

2021/0080706 A1    3/2021  Lin et al.
2024/0085720 A1*   3/2024  Kwon ...................... G03B 5/00

FOREIGN PATENT DOCUMENTS

JP          5619561 B2     11/2014
KR    20210116163 A  *  9/2021  ............. G03B 17/12

* cited by examiner

*Primary Examiner* — Wen Huang
(74) *Attorney, Agent, or Firm* — NSIP Law

(57) ABSTRACT

A camera module includes a lens module having a plurality of lenses and disposed to be movable along an optical axis, an image sensor module receiving light passing through the lens module, and a light shielding member disposed in a space between the lens module and the image sensor module, wherein the light shielding member includes a frame having a window through which the light passes, and a damping member disposed on one surface of the frame facing the lens module to limit movement of the lens module.

20 Claims, 7 Drawing Sheets

1000

600

I-I'

CAMERA MODULE

CROSS-REFERENCE TO RELATED APPLICATIONS

This application claims the benefit under 35 USC 119(a) of Korean Patent Application No. 10-2021-0160535 filed on Nov. 19, 2021, in the Korean Intellectual Property Office, the entire disclosure of which is incorporated herein by reference for all purposes.

BACKGROUND

1. Field

The present disclosure relates to a camera module.

2. Description of the Background

Camera modules may be employed in portable electronic devices including smartphones. Portable electronic devices may tend to be decreased in thickness (thinned) due to market demand, and accordingly, the miniaturization of camera modules may be required.

In particular, in order to prevent a height of the camera module from greatly affecting a thickness of the portable electronic device, a camera module having a reflective member for altering a path of light has been proposed.

Since the camera module alters the path of light through the reflective member, a total track length (a distance from a lens closest to an object side to the imaging surface of the image sensor) of the camera module may not affect the thickness of the portable electronic device.

In addition, a camera module employing a plurality of reflective members has been proposed to improve a problem that the total track length of the camera module may be too large in one direction.

However, in this case, since the optical path is formed to be elongated by the plurality of reflective members, the light may be reflected by an internal structure of the camera module before light is incident on the image sensor, and this diffusely reflected light may be incident on the image sensor and a flare phenomenon may occur.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module having a plurality of lenses and disposed to be movable along an optical axis, an image sensor module receiving light passing through the lens module, and a light shielding member disposed in a space between the lens module and the image sensor module, wherein the light shielding member includes a frame having a window through which the light passes, and a damping member disposed on one surface of the frame facing the lens module to limit movement of the lens module.

The damping member may be disposed on both sides of the window, and may be formed of a material having elasticity.

The damping member may be formed of any one of urethane, rubber, or silicone.

The camera module may further include a housing having an inner space for accommodating the lens module, the image sensor module, and the light shielding member, wherein the light shielding member may be fixedly coupled to the housing.

The housing may include a protruding wall protruding into the inner space, wherein the light shielding member may include a light shielding portion having the window formed therein, and a fixing portion extending from the light shielding portion and fastened to the protruding wall.

The fixing portion may be in contact with three surfaces of the protruding wall and may be fixed to the protruding wall.

At least a portion of the fixing portion may be disposed between the damping member and the protruding wall.

The light shielding portion and the fixing portion may be disposed on different planes from each other.

The camera module may further include a connection portion connecting the light shielding portion and the fixing portion.

At least a portion of the connection portion may be disposed to face the protruding wall.

The light shielding portion may be disposed closer to the image sensor module than the fixing portion.

A blocking film may be provided on at least a portion of a surface of the frame, The blocking film may be formed to be rougher than a surface of the housing.

A light absorption layer formed in black may be provided on at least a portion of a surface of the frame.

The light absorption layer may be formed by carbon coating a resin film.

The light absorption layer may be formed of a black oxide film.

A portable electronic device may include the camera module, wherein the optical axis may be perpendicular to a thickness of the portable electronic device.

In another general aspect, a light shielding member for a camera module includes a frame having a window through which light passes and a light shielding portion blocking light, at least one of a blocking film and a light absorption layer disposed on the light shielding portion, and a damping member disposed on a surface of the frame and configured to stop a movement of a lens barrel.

A camera module may include the light shielding member, a lens module having a plurality of lenses and disposed to be movable along an optical axis, and an image sensor module receiving light passing through the lens module and the window, wherein the light shielding member may be disposed between the lens module and the image sensor module.

Other features and aspects will be apparent from the following detailed description, the drawings, and the claims.

3

Figure 2:
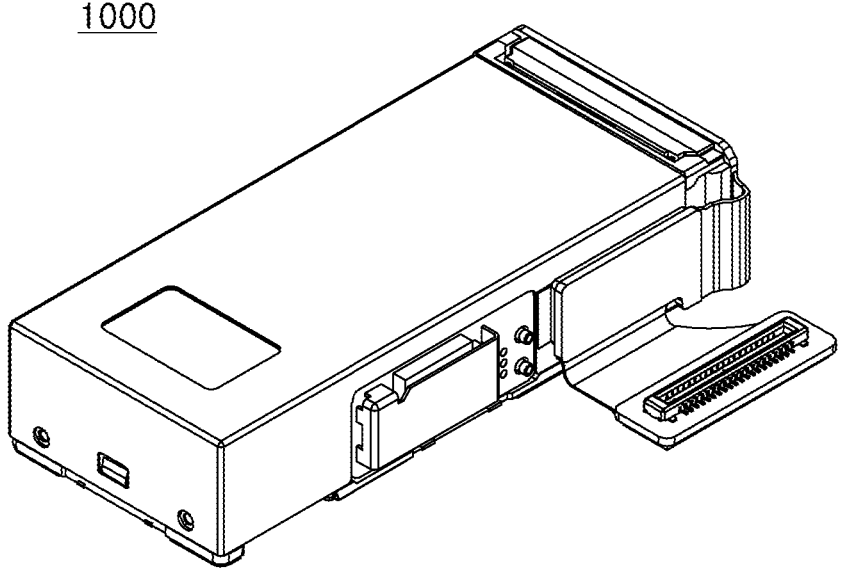
FIG. 2 is a perspective view of the camera module shown in FIG. 1.
Figure 3:
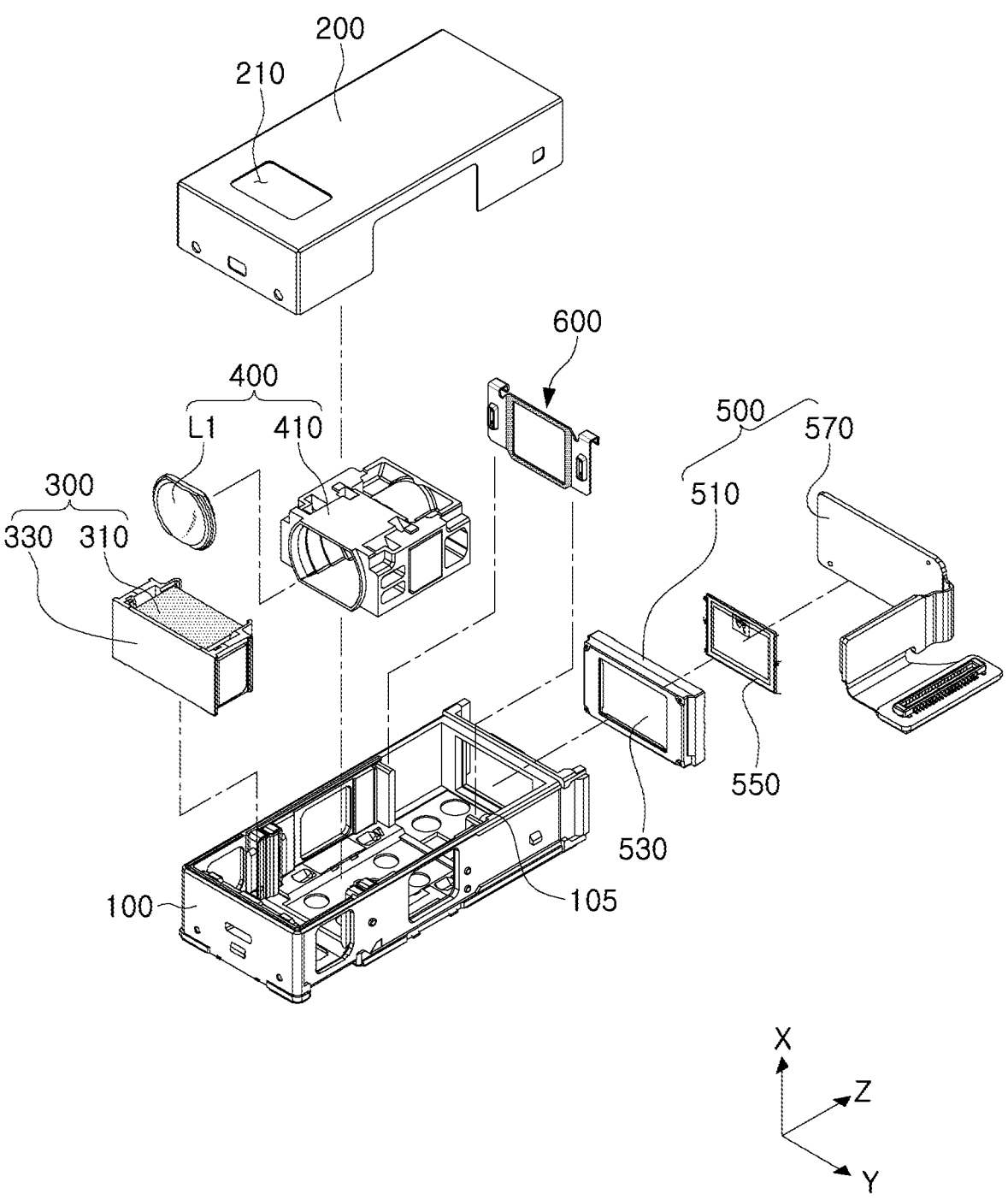

FIG. 3 is an exploded perspective view of the camera module shown in FIG. 2.

Figure 4:
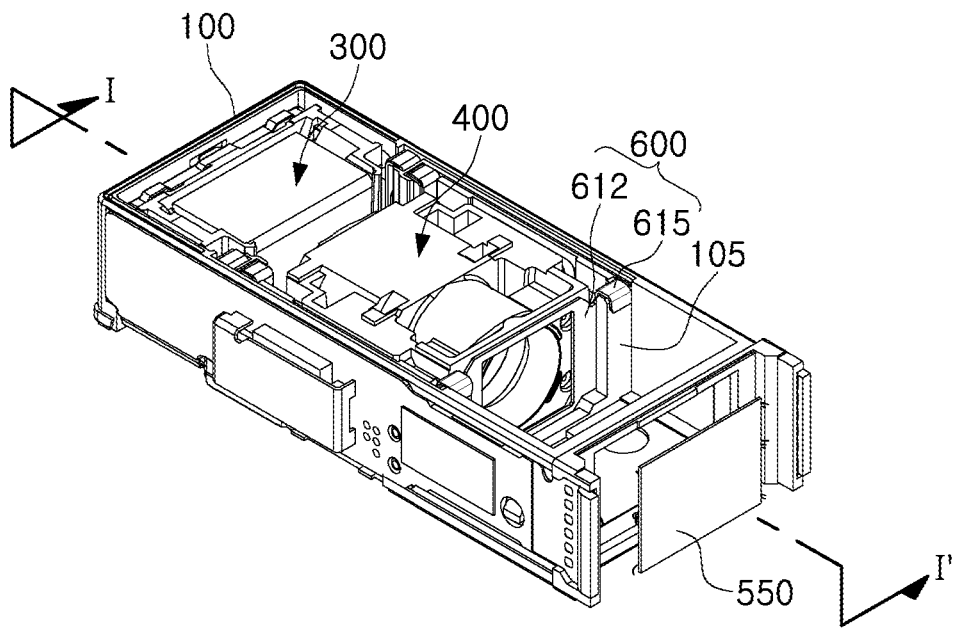

FIG. 4 is a partial perspective view of the camera module shown in FIG. 2.

Figure 5:
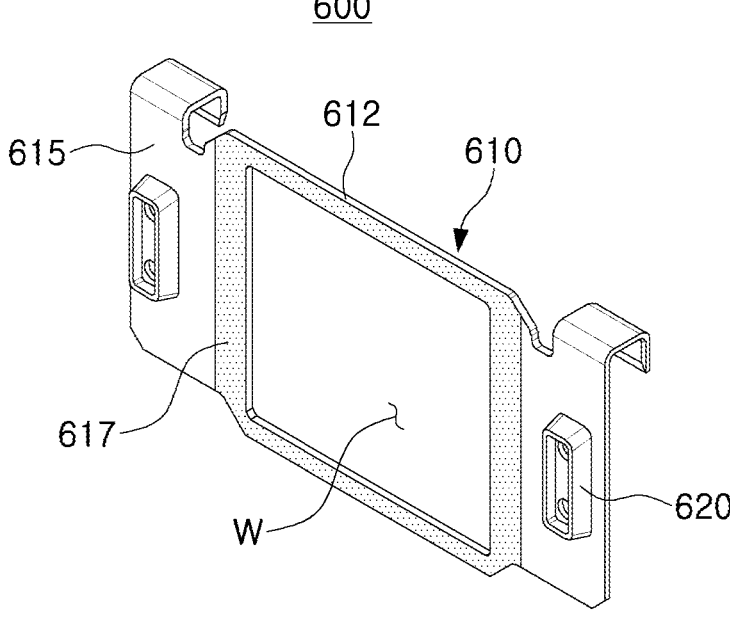

FIG. 5 is an enlarged perspective view of the light shielding member shown in FIG. 3.

Figure 6:
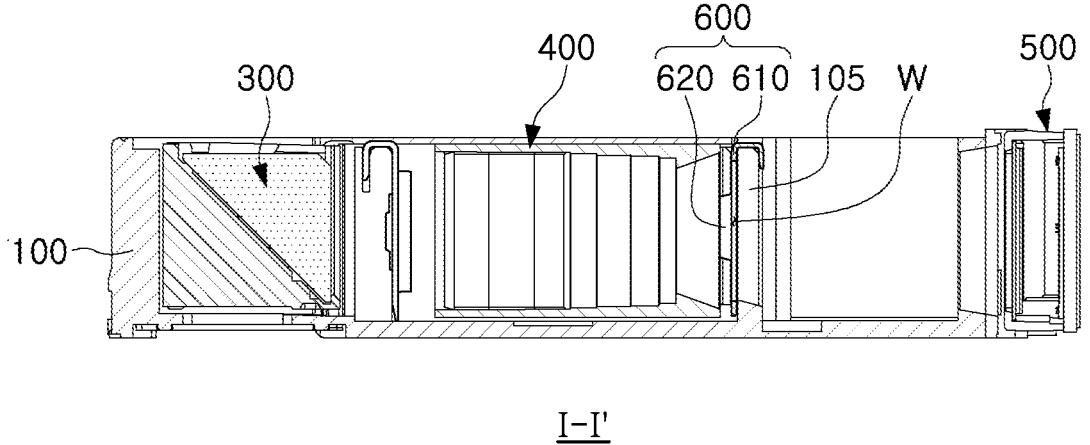

FIG. 6 is a cross-sectional view taken along line I-I' of FIG. 4.

Figure 7:
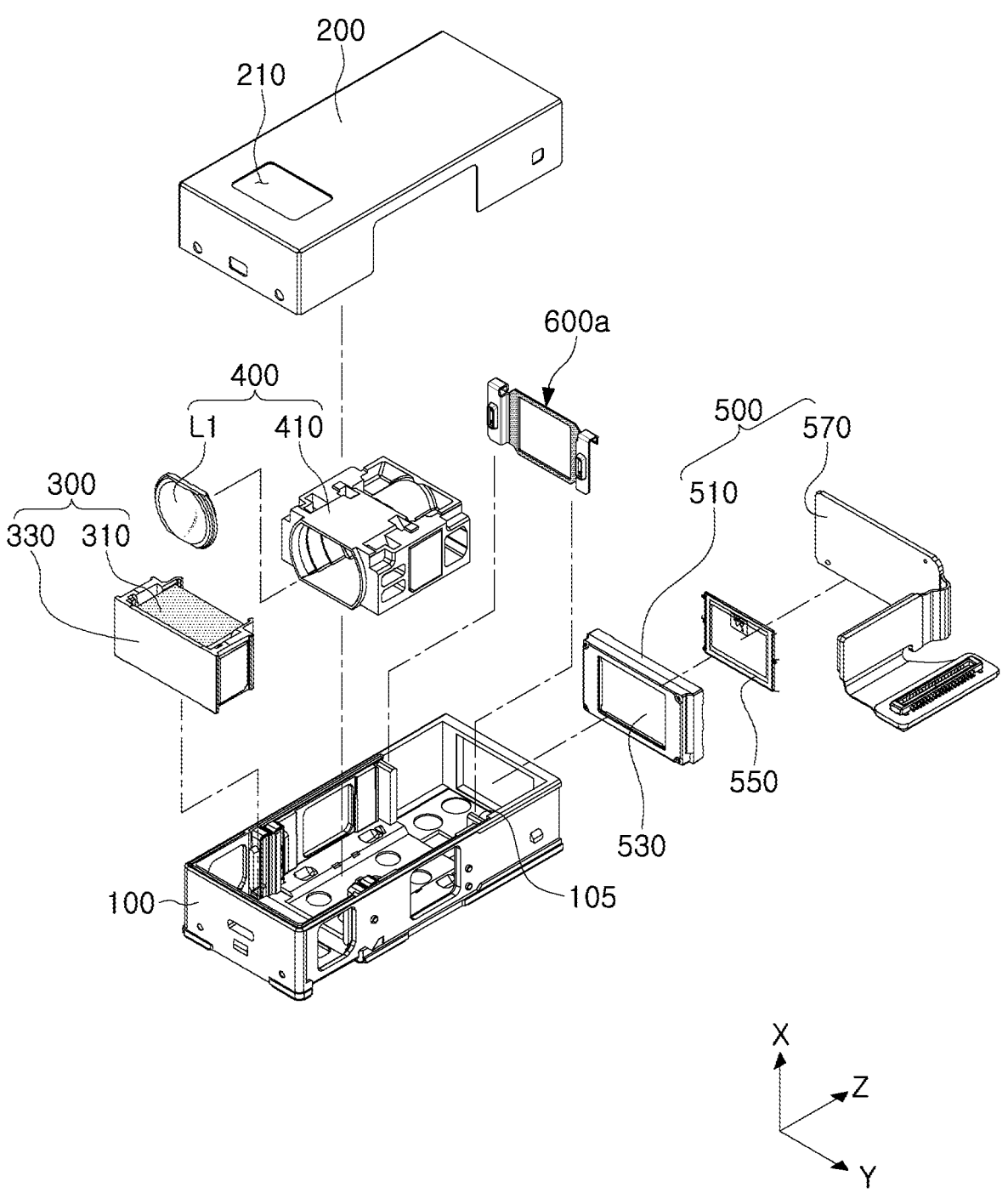

FIG. 7 is a schematic exploded perspective view of a camera module according to one or more other embodiments of the present disclosure.

Figure 8:
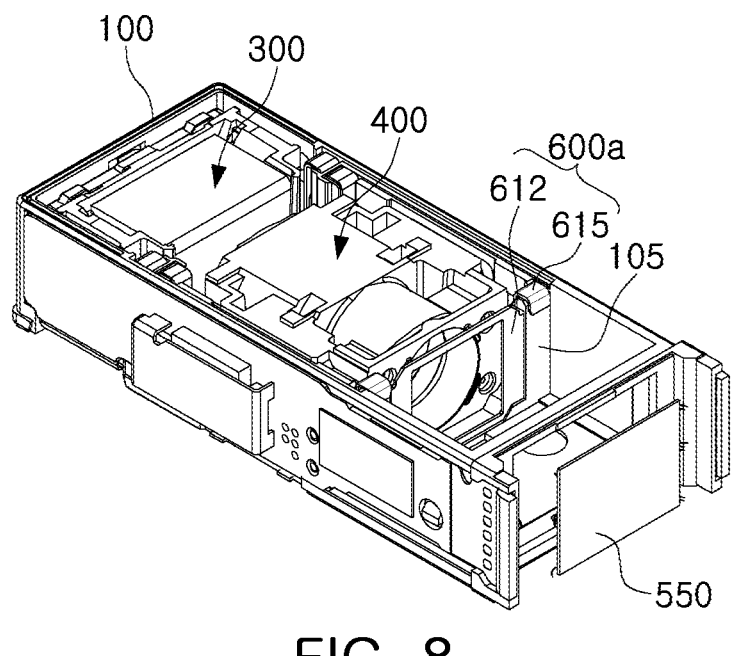

FIG. 8 is a partial perspective view of the camera module shown in FIG. 7.

Figure 9:
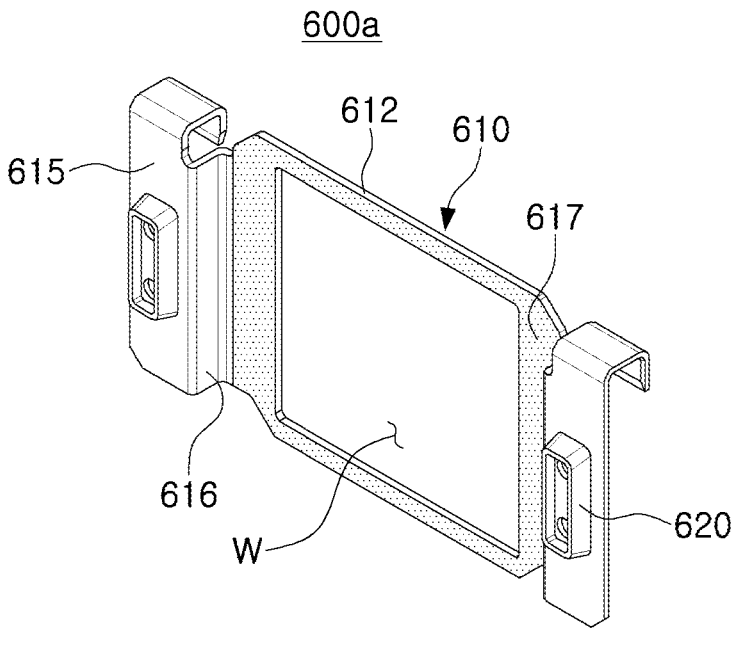

FIG. 9 is an enlarged perspective view of the light shielding member shown in FIG. 7.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Hereinafter, while example embodiments of the present disclosure are described in detail with reference to the accompanying illustrative drawings, it is noted that examples are not limited to the same.

In addition, the same reference numerals as used in the accompanying drawings denote parts or components performing substantially the same function. For ease of explanation and understanding, different embodiments will be described using the same reference numerals. In other words, even though all the elements having the same reference numerals are shown in the plural drawings, the plural drawings do not mean one embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In the present document, the X-direction, Y-direction, and Z-direction refer to a direction parallel to the X-axis, a direction parallel to the Y-axis, and a direction parallel to the Z-axis shown in the drawings, respectively. In addition, unless otherwise described, the X-direction is a concept including both the +X-axis direction and the −X-axis direction, which also applies to the Y-direction and the Z-direction.

When two directions (or axes) are described as parallel to or perpendicular to each other in the present disclosure, this also includes cases in which the two directions (or axes) are substantially parallel or substantially parallel to each other. For example, when a first axis and a second axis are perpendicular to each other, the first axis and the second axis form an angle of 90 degrees or close to 90 degrees.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a camera module capable of preventing a flare phenomenon.

Figure 1:
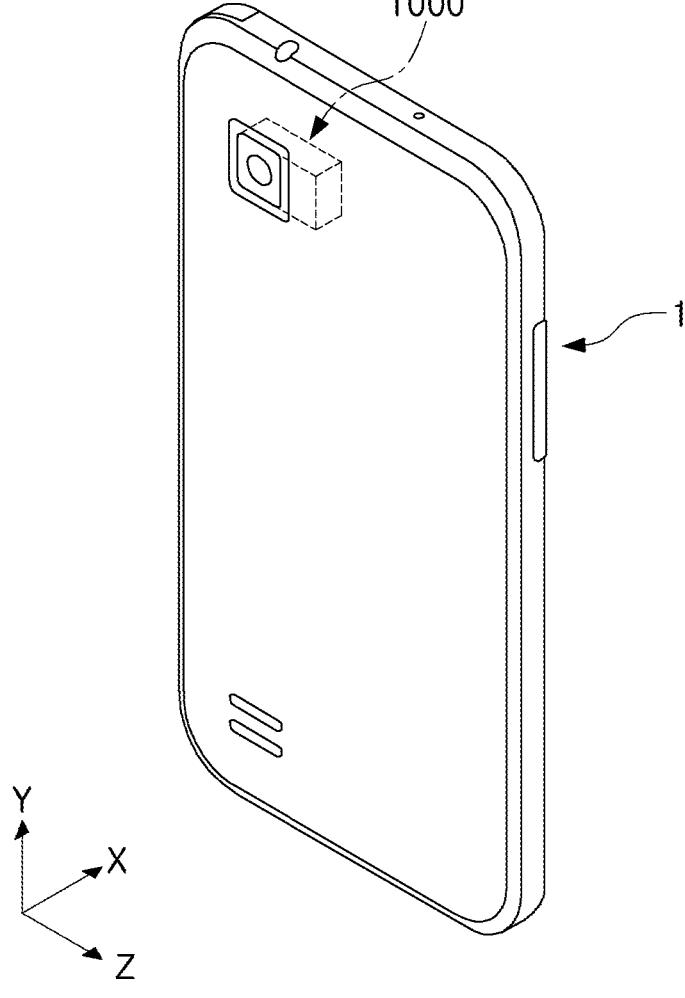
FIG. 1 is a perspective view of a portable electronic device equipped with a camera module according to one or more embodiments of the present disclosure.

FIG. 1 is a perspective view of a portable electronic device on which a camera module according to one or more embodiments of the present disclosure is mounted, and FIG. 2 is a schematic perspective view of the camera module shown in FIG. 1.

Referring to FIGS. 1 and 2, a camera module 1000 according to an embodiment of the present disclosure may be mounted on a portable electronic device 1. The portable electronic device 1 may be a portable electronic device such as a mobile communication terminal, a smartphone, a table PC, or the like.

As illustrated in FIG. 1, the camera module 1000 is mounted on the portable electronic device 1 to image a subject.

In the present embodiment, the camera module 1000 includes a plurality of lenses, and an optical axis (a Z-axis) of the lens may be directed in a direction, perpendicular to a thickness direction (a Y-axis direction, a direction from a front surface of the portable electronic device toward a rear surface thereof or vice versa) of the portable electronic device.

For example, the optical axis (the Z-axis) of the plurality of lenses provided in the camera module 1000 may be formed in the width direction or the length direction of the portable electronic device 1.

Therefore, even if functions such as autofocusing (hereinafter, referred to as AF), optical zoom (hereinafter, referred to as zoom) and optical image stabilizing (hereinafter, referred to as OIS), or the like, are provided in the portable electronic device 1, it is possible to prevent the thickness of the portable electronic device 1 from increasing. Accordingly, the portable electronic device 1 may be thinned.

The camera module 1000 according to an embodiment of the present disclosure may be provided with at least one of AF, zoom, and OIS functions.

Since the camera module 1000 including AF, zoom, OIS functions, and the like, needs to be provided with various parts, the size of the camera module may be increased as compared to the general camera module.

When the size of the camera module 1000 increases, it may be difficult to reduce the thickness of the portable electronic device 1 on which the camera module 1000 is mounted.

For example, the camera module may include a plurality of lens groups for the zoom function. When the plurality of lens groups are disposed in the thickness direction of the portable electronic device, the thickness of the portable electronic device also increases according to the number of lens groups. Accordingly, if the thickness of the portable electronic device is not increased, the number of lens groups cannot be sufficiently secured, and thus zoom performance may be weakened.

In addition, to implement the AF, zoom, and OIS functions, an actuator moving a plurality of lens groups in the optical axis direction or a direction, perpendicular to the optical axis should be installed. When the optical axis (the Z-axis) of the lens group is formed in the thickness direction of the portable electronic device, an actuator for moving the lens group should also be installed in the thickness direction of the portable electronic device. Therefore, the thickness of the portable electronic device is increased.

However, since in the camera module 1000 according to an embodiment of the present disclosure, the optical axes (the Z-axis) of the plurality of lenses are disposed to be perpendicular to the thickness direction of the portable electronic device 1, even if the camera module 1000 provided with the AF, zoom, and OIS functions is mounted thereon, the portable electronic device 1 can be thinned.

FIG. 3 is a schematic exploded perspective view of the camera module shown in FIG. 2. In addition, FIG. 4 is a partial perspective view of the camera module shown in FIG. 2, with a case and a circuit board omitted from the illustration for convenience of understanding.

Referring to FIGS. 3 and 4, a camera module 1000 may include a housing 100, a reflective module 300, a lens module 400, an image sensor module 500, and a case 200.

A reflective module 300, a lens module 400, and an image sensor module 500 may be disposed inside the housing 100 from one side to the other side. The housing 100 may have an inner space to accommodate the reflective module 300, the lens module 400, and the image sensor module 500. However, the image sensor module 500 may be attached to an outside of the housing 100.

In FIGS. 2 and 3, an embodiment in which the reflective module 300, the lens module 400, and the image sensor module 500 are disposed inside the housing 100 is illustrated. However, unlike the embodiments of FIGS. 2 and 3, the reflective module 300 may be disposed outside the housing 100, and in this case, one side of the housing 100 may be opened so that the light transmitted from the reflective module 300 passes therethrough.

The housing 100 may have a box shape having an open upper portion.

A protruding wall may be provided inside the housing. The protruding wall may be formed to protrude from a sidewall of the housing toward the inner space. A blocking portion having a window, which will be described later, is coupled to the protruding wall. Accordingly, the protruding wall may be disposed inside the housing, and may be disposed within a range that does not block the window of the blocking portion.

The case 200 is coupled to the housing 100 so as to cover an upper portion of the housing 100. The case 200 may have an opening 210 through which light is incident. The light incident through the opening 210 of the case 200 may be incident on a lens module 400 by altering a traveling direction by a reflective module 300.

The reflective module 300 may be configured to alter a traveling direction of light. For example, a traveling direction of the light incident into the housing 100 may be changed toward the lens module 400 through the reflective module 300. Therefore, based on an optical path, the reflective module 300 may be disposed in front of the lens module 400.

The reflective module 300 includes a reflective member 310 and a holder 330 on which the reflective member 310 is mounted.

The reflective member 310 is configured to change a traveling direction of light. For example, the reflective member 310 may be a mirror or a prism reflecting light.

The lens module 400 may include a plurality of lenses through which the light whose traveling direction is changed by the reflective member 310 passes, and a lens barrel 410 accommodating the plurality of lenses.

For convenience of explanation, only the lens L1 disposed closest to an object side among the plurality of lenses is illustrated in FIG. 3, but the present disclosure is not limited thereto.

The image sensor module 500 may include a sensor housing 510, an infrared cut-off filter 530, an image sensor 550, and a circuit board 570.

An infrared cut-off filter 530 may be mounted on the sensor housing 510. The infrared cut-off filter 530 serves to block light in an infrared region among the light passing through the lens module 400.

The circuit board 570 may be coupled to the sensor housing 510, and the image sensor 550 may be mounted on one surface thereof.

Accordingly, the light passing through the lens module 400 may pass through the infrared cut-off filter 530 to be received by the image sensor 550.

The reflective module 300, the lens module 400, and the image sensor module 500 according to the present embodiment may be disposed in an optical axis direction (Z-axis direction), and the light whose traveling direction is changed by the reflective module 300 may be incident on the image sensor 550 through the lens module 400.

However, if unintentional reflection occurs before the light is incident on the image sensor 550, a flare phenomenon may occur therefrom. For example, before the light passing through the lens module 400 reaches the image sensor 550, when the light reflected from a bottom surface of the housing 100 or an inner surface of the case 200 (a surface facing the bottom surface of the housing 100) is incident on the image sensor 550, a flare phenomenon may occur.

As such, a flare phenomenon may occur due to internal reflection occurring in the space between the lens module 400 and the image sensor 550.

Accordingly, the camera module 1000 according to the present embodiment may include a light shielding member 600 to prevent a flare phenomenon due to unintentional reflection of light.

FIG. 5 is an enlarged perspective view of the light shielding member shown in FIG. 3, and FIG. 6 is a cross-sectional view taken along line I-I' of FIG. 4.

Referring to FIGS. 5 and 6 together, a light shielding member 600 may be disposed in a space between the lens module 400 and the image sensor module 500. For example, the light shielding member 600 may be disposed in a space between a lens, closest to the image sensor module among a plurality of lenses provided in the lens module 400 and the image sensor module 500.

Accordingly, when unintentional reflection of light occurs between the lens module 400 and the image sensor module 500, the light shielding member 600 may block the reflected light from flowing into the image senor.

Accordingly, it is possible to prevent unnecessary light from being incident on the image sensor 550, and thus, it is possible to suppress an occurrence of a flare phenomenon due to the reflection of the light.

The light shielding member 600 of the present embodiment may include a frame 610 and a damping member 620.

The frame 610 may have a rectangular shape having a long side and a short side, and may include a light shielding portion 612 and a fixing portion 615.

The light shielding portion 612 may include an opening-shaped window W therein. The window W may pass light through the lens module 400 to be incident on the image sensor 550. Accordingly, light used for image formation may pass through the window W and may be incident on the image sensor 550, and light that may cause a flare phenomenon may be blocked by the frame 610.

The fixing portion 615 may be disposed on both ends of the frame 610 to be fixedly coupled to the housing 100.

Specifically, the fixing portion 615 may be respectively coupled to the protruding wall 105 of the housing 100 described above.

In addition, the light shielding member 600 of the present embodiment may function as a stopper for limiting movement of the lens module 400. Accordingly, when the lens module 400 moves toward the image sensor module 500 as much as possible, the lens module 400 comes into contact with the light shielding member 600, and thus movement toward the image sensor module 500 may be limited.

As the lens module 400 repeatedly contacts the light shielding member 600, an impact according to the contact may be repeatedly generated between the light shielding member 600 and the lens module 400. Accordingly, the light shielding member 600 must be stably fixed to the protruding wall 105 even when the above-described impact is repeatedly generated. To this end, the fixing portion 615 of the present embodiment may contact at least three surfaces of the protruding wall 105 and be coupled to the protruding wall 105.

As illustrated in FIGS. 4 and 6, the fixing portion 615 may be coupled to the protruding wall 105 in a form surrounding two surfaces of the protruding wall 105, disposed to be perpendicular to an optical axis direction, and an upper surface of the protruding wall 105. However, the configuration of the present disclosure is not limited thereto, and it is also possible to configure the fixing portion 615 to contact only one or two surfaces of the protruding wall 105. In addition, the fixing portion 615 may be bonded to the protruding wall 105 through an adhesive or may be fastened to the protruding wall 105 through a separate fastening member.

In the present embodiment, a frame 610 may be formed of a metal material. However, the configuration of the present disclosure is not limited thereto, and various modifications are possible as needed, such as forming the frame 610 of a resin material or an inorganic material.

A blocking film for blocking movement of light by scattering light may be provided on a surface of the frame 610. The blocking film may be formed to increase surface roughness of the frame 610 by performing surface treatment of the frame 610. Accordingly, light incident on the surface of the frame 610 may be diffusely reflected by the blocking film and may be extinguished or may be blocked from proceeding.

In the present embodiment, the surface of the blocking film may be formed to be rougher than a surface of the housing 100, and to this end, a surface of the frame 610 may be corroded.

However, an example embodiment of the present inventive concept is not limited thereto, and it is also possible to separately manufacture a blocking film in a form in a thin film and then attach the same to the surface of the frame 610.

In addition, a light absorption layer 617 blocking unnecessary light may be provided on the surface of the frame 610. The light absorption layer 617 may be provided to lower reflectance of the surface of the frame 610, and may be formed in black.

The light absorption layer 617 may be provided by forming a black oxide film on the surface of the frame 610. However, an embodiment of the present disclosure is not limited thereto, and as long as the surface of the frame 610 can be formed in black, various methods can be used. For example, the light absorption layer 617 in a form of a thin film may be manufactured and attached to the surface of the frame 610. In this case, after carbon coating a film made of a resin material such as Polyethylene Terephthalate (PET), it may be attached to the frame 610 to be used as the light absorption layer 617. It is also possible to form the light absorption layer 617 by directly applying a black paint to the surface of the frame 610.

In the present embodiment, a case in which a blocking film and a light absorption layer 617 are formed in the same region will be described as an example. In this case, the light absorption layer 617 may be formed by coloring a surface of the blocking film, or a blocking film may be formed by increasing the surface roughness of the light absorption layer 617.

The blocking film or the light absorption layer 617 may be formed on at least one of both surfaces of the frame 610. In addition, the blocking film and the light absorption layer 617 may be formed only on a portion of the surface of the frame 610. However, an example embodiment of the present inventive concept is not limited thereto, and it is also possible to form a blocking film or a light absorption layer 617 on the entirety of one or both surfaces of the frame 610.

When the blocking film or the light absorption layer 617 is formed only on a partial region of the frame 610, the blocking film or the light absorption layer 617 may be concentrated around a window W as shown in FIG. 5. For example, the blocking film or the light absorption layer 617 may be disposed only on the light shielding portion 612. However, an embodiment of the present disclosure is not limited thereto.

Also, as an embodiment, it may be deformed into various shapes as needed, such as forming a blocking film on some regions on a surface of the frame 610, forming a light absorption layer 617 on other regions, and the like. For example, the blocking film may be formed on the entire surface of the frame 610, and the light absorption layer 617 may be formed only on the light shielding portion 612.

As described above, the light shielding member 600 of the present embodiment may function as a stopper of the lens module 400. Accordingly, when the lens module 400 moves toward the image sensor module 500 as far as possible, the lens module 400 may contact the light shielding member 600. In this process, in order to minimize the impact applied to the light shielding member 600 or the lens module 400, the light shielding member 600 may be provided with a damping member 620.

The damping member 620 may be disposed on the fixing portion 615, and may be disposed on one surface facing the lens module 400 among both surfaces of the frame 610. A plurality of damping members 620 may be dispersedly disposed around the window W, and in the present embodiment, the two damping members 620 are disposed in the fixing portions 615 on both sides of the window W, respectively.

Since an impact is repeatedly applied to the damping member 620, a portion corresponding to the damping member 620 on the other surface of the frame 610 needs to be firmly supported. Accordingly, the camera module of the present embodiment may be supported by the fixing portion 615 and the entirety thereof may be supported by the protruding wall 105.

More specifically, the damping member 620 may be disposed in a region corresponding to the protruding wall 105 on one surface of the frame 610. Here, the region corresponding to the protruding wall 105 refers to a region in which a projected shape of the damping member 620 is disposed, when the protruding wall 105 is projected onto one surface of the frame 610. Accordingly, at least a portion of the fixing portion 615 may be disposed between the damping member 620 and the protruding wall 105.

The damping member 620 may be formed of a material having elasticity to absorb impacts. For example, the damping member 620 may be formed of any one of urethane, rubber, and silicone, but an example embodiment thereof is not limited thereto.

The camera module of the present embodiment configured as described above may provide a function of a stopper of the lens module 400 as well as shielding unnecessary light by the light shielding member 600. Therefore, there is no need to separately provide a member serving as a stopper of the lens module 400, and a process of installing such a member in the housing 100 can be omitted.

Accordingly, manufacturing costs can be reduced, and manufacturing processes can also be simplified. In addition, since elements disposed inside the housing 100 can be reduced, an overall volume of the camera module can be minimized.

However, the camera module of the present disclosure is not limited to the above-described embodiments, and various modifications may be performed.

FIG. 7 is a schematic exploded perspective view of a camera module according to one or more other embodiments of the present disclosure, FIG. 8 is a partial perspective view of the camera module shown in FIG. 7, and for convenience of understanding, a case and a circuit board are omitted from the illustration in FIG. 8. Also, FIG. 9 is an enlarged perspective view of the light shielding member 600a shown in FIG. 7.

Referring to FIGS. 7 to 9, in the camera module of the present embodiment, a light shielding portion 612 may be disposed at a position, close to the image senor module 500. Moreover, the light shielding portion 612 may be disposed on a different plane from a fixing portion 615. Here, the fixing portion 615 refers to a portion disposed between a damping member 620 of the fixing portion 615 and the protruding wall 105, rather than the entire region of the fixing portion 615.

To this end, a connection portion 616 may be formed between the light shielding portion 612 and the fixing portion 615. The connection portion 616 is a portion connecting the light shielding portion 612 and the fixing portion 615, and may be formed by bending a frame 610 through press working, or the like. Accordingly, a distance between the light shielding portion 612 and the fixing portion 615 may be defined according to the size of the connection portion 616.

The connection portion 616 may be disposed to surround the other surface of the protruding wall 105. Accordingly, the fixing portion 615 and the connection portion 616 may be configured to surround four surfaces of the protruding wall 105 and be fixed to the protruding wall 105. In addition, at least a portion of the connection portion 616 may be disposed to face the protruding wall 105. Specifically, at least a portion of the connection portion 616 may be disposed in parallel with one surface of the protruding wall 105, and may be disposed in adjacent to the one surface or disposed to be very adjacent to the one surface. Here, one surface of the protruding wall 105 may refer to a surface disposed parallel to an optical axis direction.

When the fixing portion 615 and the light shielding portion 612 are configured to be disposed on the same plane as in the above-described embodiment, a distance between the light shielding member 600 and the image sensor module 500 may be excessively spaced apart. In this case, diffuse reflection of light may occur in the space between the light shielding member 600 and the image sensor module 500, which may cause a flare phenomenon.

However, when the light shielding member 600 of the present embodiment is used, since the light shielding portion 612 is disposed close to the image sensor module 500, the above-described problem can be minimized.

As set forth above, according to an embodiment of the present disclosure, a camera module may prevent a flare phenomenon.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module having a plurality of lenses, and disposed to be movable along an optical axis;
an image sensor module receiving light passing through the lens module; and
a light shielding member disposed in a space between the lens module and the image sensor module,
wherein the light shielding member comprises:
a frame having a window through which the light passes; and
a damping member disposed directly on one surface of the frame facing the lens module to limit movement of the lens module.

2. The camera module of claim 1, wherein the damping member is disposed on both sides of the window, and is formed of a material having elasticity.

3. The camera module of claim 1, wherein the damping member is formed of any one of urethane, rubber, or silicone.

4. The camera module of claim 1, further comprising a housing having an inner space for accommodating the lens module, the image sensor module, and the light shielding member,
wherein the light shielding member is fixedly coupled to the housing.

5. The camera module of claim 4, wherein the housing comprises a protruding wall protruding into the inner space,
wherein the light shielding member comprises a light shielding portion having the window formed therein, and a fixing portion extending from the light shielding portion and fastened to the protruding wall.

6. The camera module of claim 5, wherein the fixing portion is in contact with three surfaces of the protruding wall and is fixed to the protruding wall.

7. The camera module of claim 5, wherein at least a portion of the fixing portion is disposed between the damping member and the protruding wall.

8. The camera module of claim 5, wherein the light shielding portion and the fixing portion are disposed on different planes from each other.

9. The camera module of claim 8, further comprising a connection portion connecting the light shielding portion and the fixing portion.

10. The camera module of claim 9, wherein at least a portion of the connection portion is disposed to face the protruding wall.

11. The camera module of claim 8, wherein the light shielding portion is disposed closer to the image sensor module than the fixing portion.

12. The camera module of claim 4, wherein a blocking film is provided on at least a portion of a surface of the frame,
wherein the blocking film is formed to be rougher than a surface of the housing.

13. The camera module of claim 1, wherein a light absorption layer formed in black is provided on at least a portion of a surface of the frame.

14. The camera module of claim 13, wherein the light absorption layer is formed by carbon coating a resin film.

15. The camera module of claim 13, wherein the light absorption layer is formed of a black oxide film.

16. A portable electronic device comprising:
the camera module of claim 1,
wherein the optical axis is perpendicular to a thickness of the portable electronic device.

17. A light shielding member for a camera module, the light shielding member comprising:
a frame having a window through which light passes and a light shielding portion blocking light;
at least one of a blocking film and a light absorption layer disposed on the light shielding portion; and
a damping member disposed directly on a surface of the frame and configured to stop a movement of a lens barrel.

18. The light shielding member of claim 17, wherein the damping member is disposed on both sides of the window, and is formed of a material having elasticity.

19. A camera module comprising:
the light shielding member of claim 17;
a lens module having a plurality of lenses, and disposed to be movable along an optical axis; and
an image sensor module receiving light passing through the lens module and the window,
wherein the light shielding member is disposed between the lens module and the image sensor module.

20. A portable electronic device comprising:
the camera module of claim 19,
wherein the optical axis is perpendicular to a thickness of the portable electronic device.

* * * * *